3,277,017
V₂O₅–Ag₃PO₄ CONTAINING OXIDATION CATALYSTS
Walter J. Stefaniak, Cheektowaga, N.Y., assignor to Allied Chemical Corporation, New York, N.Y., a corporation of New York
No Drawing. Filed Jan. 6, 1961, Ser. No. 80,995
8 Claims. (Cl. 252—437)

This invention relates to improvements in the vapor phase oxidation of organic compounds to dicarboxylic acid anhydrides, and more particularly to the preparation and utilization of an improved vanadium oxide catalyst in this process.

The vapor phase oxidation of organic compounds to maleic and phthalic anhydrides is a well known commercial process. Although a variety of aromatic compounds such as benzene, toluene, the cymenes, phenol, the cresols, orthoxylene, naphthalene, and aliphatic hydrocarbons such as butenes have been suggested and used, benzene, naphthalene and orthoxylene are the principal raw materials for the present day, large scale, manufacturing procedures. Similarly, of the numerous catalysts suggested for these important commercial syntheses, those based on vanadium oxide are most widely, if not exclusively, used. Such catalysts generally comprise the catalytic material on a suitable catalyst support with or without various other materials which act as promoters or modifiers.

These catalysts are placed in a suitable chamber, the converter, in which the reaction takes place. A mixture of the organic compound and an oxygen-containing gas is passed through the converter wherein the vapors and catalyst are brought into brief and intimate contact at elevated temperatures. Highly exothermic reactions ensue which are customarily controlled by surrounding the converter with an efficient heat exchanging medium such as boiling mercury, molten salt mixtures, and the like.

In general the yields of dicarboxylic acid anhydride obtained from commercial operations are well below theoretical. For example, the oxidation of benzene to maleic anhydride produces yields of from 60 to 85 lbs. of maleic anhydride per 100 lbs. of benzene charged. Catalysts composed essentially of vanadium pentoxide are commonly employed for phthalic anhydride preparation, while mixed catalysts composed essentially of vanadium pentoxide-molybdenum trioxide mixtures have been found to be especially effective for maleic anhydride synthesis. Those catalysts composed essentially of vanadium pentoxide and molybdenum trioxide mixtures have relatively short-lived periods of efficient operation when used in the optimum temperature range of 450–550° C. This is due primarily to volatilization of molybdenum oxide from the catalyst.

It is therefore an object of this invention to devise an improved process for the vapor phase catalytic oxidation of suitable organic compounds to dicarboxylic acid anhydrides.

Another object of this invention is to provide new catalyst mixtures which provide high dicarboxylic acid anhydride yields, operate effectively at low temperatures, and have long, useful lives when used in vapor phase oxidation processes.

In accordance with the present invention, catalytic oxidation of organic compounds to dicarboxylic acid anhydrides is effected in the presence of a vanadium pentoxide catalyst which contains a small effective amount of silver orthophosphate as a modifier. The invention embraces the novel catalysts employed in the process as well as the oxidation process itself.

The invention is especially concerned with vanadium pentoxide-molybdenum trioxide catalysts. With such catalyst compositions, I have found that the process can be operated at optimum conditions at significantly lower temperatures to produce excellent yields at high production capacity. Moreover, the life of the catalysts containing molybdenum is substantially prolonged compared to prior vanadium oxide-molybdenum oxide catalysts.

While molybdenum modified catalysts have been used extensively for the production of maleic anhydride, they have not been used commercially for phthalic anhydride manufacture so far as I am aware. The catalysts of the present invention have been found to be effective not only for maleic anhydride manufacture, but also for the manufacture of phthalic anhydride, and have been found to produce superior yields of the latter compound from orthoxylene and naphthalene in comparison with catalysts formerly used in this process. The superiority is particularly notable in the case of orthoxylene.

A particularly useful catalyst comprises a suitable support, e.g., fused alumina, ceramically bonded silicon carbide, and the like, containing thereon a mixture of about 60 to 85 percent vanadium pentoxide, about 6 to 25 percent molybdenum trioxide, about 1 percent of uranium dioxide, and an amount of silver orthophosphate equal to from about 2% to about 20% of the weight of the vanadium pentoxide. Although catalysts containing 60 to 85% vanadium pentoxide are preferred, those catalysts containing $V_2O_5$ and $MoO_3$ in the proportions of from 15:1 to 1:2 by weight are suitable.

Yields of maleic and phthalic acid anhydrides which are obtained from benzene, naphthalene, and orthoxylene by using my novel catalyst composition are in the range of 85–111 lbs. or more per 100 lbs. of vaporized organic compound used as starting material. In the case of maleic anhydride the catalyst functions at temperatures about 30° C. lower than the standard known catalyst, and maintains its activity for periods of at least one year in normal usage. These advantages result in an increased production of maleic anhydride of more than 200 percent in pounds of benzene oxidized per pound of catalyst used with greater efficiency as measured by the yield of maleic anhydride obtained.

The amount of silver orthophosphate present can be varied over a considerable range, that is from about 2 percent to about 20 percent or more of the weight of the $V_2O_5$ present. In the absence of an auxiliary promoter, a number of which are set out below, lesser amounts of silver orthophosphate produce relatively slight and hardly significant improvements. Larger proportions than 20 percent on the other hand, do not significantly improve the operating characteristics of the catalyst, hence in view of the relatively high cost of this ingredient, are not recommended. Preferably only about 6 to 12 percent silver orthophosphate based on the weight of $V_2O_5$ present should be used, the lower amounts when an auxiliary promoter is present and a higher amount in the absence thereof.

The vanadium is preferably incorporated into the catalyst as vanadium pentoxide, but it will be understood that this compound may be partially reduced during the oxidation reaction, and therefore the active vanadium catalyst is probably a mixture of vanadium oxides. The molybdenum trioxide may also be reduced during the oxidation reaction, and thus may also be present as a mixture of molybdenum oxides.

Although the principles of the present invention are illustrated hereinbelow by reference to the oxidation of benzene, naphthalene, and ortho-xylene it is evident that other aromatic compounds can be used to similar advantage.

Although the catalysts for the oxidation of aromatic compounds are not directly interchangeable with those used for the oxidation of butenes, $V_2O_5$–$MoO_3$ forms the basis for both catalysts. Silver orthophosphate can improve the butene catalyst in the same fashion that this promoter has been found to be effective for the benzene, orthoxylene and toluene catalyst.

The invention is illustrated by the following examples in which parts are by weight and temperatures are given in degrees centigrade.

EXAMPLE I

A. Preparation of catalyst

A solution of 94.5 parts of vanadium pentoxide in 1200 parts of distilled water and about 106 parts of 28° Bé. aqua ammonia was agitated and heated to 80 to 85°. A slow steady stream of sulfur dioxide was passed into the solution for four hours to reduce the oxide. Then 37 parts of ammonium molybdate were added, and the reaction was continued for one-half hour. The mixture was evaporated to about one-half its volume, and then diluted with water back to the original volume. To this mixture was added 106 parts of 28° Bé. aqua ammonia and 15 parts of ammonium metavanadate. In separate vessels, 2.47 parts of uranyl nitrate hexahydrate were dissolved in 50 parts of water, and 1.15 parts of ammonium metavanadate were dissolved in 75 parts of water. The latter solution was heated to 85°, and the former solution was added to the hot solution. After about 30 minutes, the mixed solutions were added to the main slurry, and then 5.52 parts of silver phosphate were added. The mixture was agitated at 80 to 85° and 600 parts of "Alundum," Al–38, (porous fused alumina), 6 to 8 mesh, granules were added. The water was then removed by evaporation. The resulting coated granules had the following composition by weight.

| | Percent |
|---|---|
| $V_2O_5$ | 72.6 |
| $MoO_3$ | 22.4 |
| $UO_2$ | 0.9 |
| $Ag_3PO_4$ | 4.1 |

B. Maleic anhydride preparation

A tubular, mercury-cooled converter of conventional design, the tubes of which were loaded with the catalyst prepared as in A above (3" blank, 16" catalyst) was used to test the efficiency of the catalyst. Benzene-air mixtures were passed through the converter while maintaining operating conditions as indicated in the table below. The exit gases were passed into a water scrubber and the maleic acid content of the scrubbings was determined. These results are from runs conducted for about 20 hours' duration. The results are given in Table I below.

TABLE I

| Benzene | | Air, g./hr. | Air/Benzene Ratio | Catalyst, Avg. Temperature | Maleic Acid Produced, g. | Maleic Acid, lbs. per 100 lbs. Benzene |
|---|---|---|---|---|---|---|
| G./hr. | Total Grams Vaporized | | | | | |
| 38.7 | 910 | 2,045 | 53 | 505 | 895 | 98.5 |
| 73.5 | 1,470 | 2,120 | 28.8 | 500 | 1,456 | 99.0 |
| 76.5 | 1,525 | 2,130 | 27.9 | 460 | 1,450 | 95.0 |
| 72.2 | 1,300 | 2,145 | 29.7 | 495 | 1,280 | 98.3 |
| 74.5 | 1,490 | 2,050 | 27.5 | 500 | 1,487 | 99.8 |

EXAMPLE II

A. Catalyst preparation

A solution of 94.5 parts of "orange salt" (containing 85.5 parts $V_2O_5$) in 1200 parts of distilled water and 106 parts of 28° Bé. aqua ammonia was agitated and heated to 80 to 85°. Sulfur dioxide was passed into the mass for 4 hours, and after the addition of 37 parts of ammonium molybdate, the sulfur dioxide was added 30 minutes longer. The excess sulfur dioxide was expelled by evaporating the mixture to about one-half its volume, and thereafter the mixture was diluted with water back to the original volume. To this mixture were added 106 parts of 28° Bé. aqua ammonia and 15 parts of ammonium metavanadate.

Uranyl vanadate was prepared by dissolving 2.47 parts of uranyl nitrate in 50 parts of hot (85°) water and adding to the solution a hot (85°) solution of 1.15 parts of ammonium metavanadate in 75 parts of water. The mixture was permitted to stand for 15 minutes and then added to the above reduced mixture. The resulting mixture was agitated for 10 minutes, and then to it was added a solution of 8.25 parts of silver phosphate and 3.35 parts of silver nitrate dissolved in 45 parts of 28° Bé. aqua ammonia.

The combined mixture was transferred to a coater and evaporated therein to about ⅓ its volume.

Then 600 parts of 3/16" x 3/16" pellets of "Alundum" (mix AL–746, product of the Norton Co.) were charged and the mixture was evaporated to dryness. The mass was cooled slowly and then screened to remove coarse and fine particles.

The resulting coating composition had the following approximate composition by weight.

| | Percent |
|---|---|
| $V_2O_5$ | 69.5 |
| $MoO_3$ | 21.4 |
| $UO_2$ | 0.94 |
| $AgNO_3$ | 2.39 |
| $Ag_3PO_4$ | 5.87 |

B. Maleic anhydride production

The catalyst prepared in Part A above was charged to a tubular converter as in Example I, Part B, above. Benzene-air mixtures were oxidized in this converter in a manner similar to that of said Example I. The results of a series of runs (about 20 hours each) are given in Table II below.

TABLE II

| Benzene | | Air, gms./hr. | Air/Benzene Ratio | Catalyst, Avg. Temperature | Maleic Acid Produced, g. | Maleic Acid, lbs./100 lbs. Benzene |
| --- | --- | --- | --- | --- | --- | --- |
| Total Grams Vaporized | Gms./hr. | | | | | |
| 180 | 9.0 | 757 | 84.0 | 422 | 178 | 99.2 |
| 191 | 9.6 | 775 | 84.5 | 424 | 202 | 105.9 |
| 195 | 9.8 | 761 | 78.1 | 415 | 199 | 101.9 |
| 172 | 8.6 | 775 | 90.2 | 410 | 166 | 96.5 |
| 282 | 14.2 | 768 | 54.5 | 470 | 316 | 111.8 |
| 294 | 14.7 | 1,185 | 80.7 | 480 | 315 | 107.2 |
| 390 | 19.5 | 743 | 48.2 | 520 | 417 | 107.0 |
| 330 | 16.5 | 815 | 49.3 | 500 | 370 | 111.8 |
| 297 | 14.8 | 818 | 44.5 | 505 | 311 | 105.0 |
| 330 | 16.5 | 822 | 49.8 | 530 | 342 | 103.5 |
| 327 | 16.3 | 795 | 48.7 | 520 | 350 | 107.0 |
| 334 | 16.6 | 805 | 48.3 | 536 | 345 | 103.3 |
| 336 | 16.7 | 797 | 47.3 | 536 | 357 | 106.5 |

EXAMPLE III

A. Catalyst preparation

The catalyst was prepared in the same manner as in Example II-A except that the addition of silver orthophosphate was omitted.

B. Maleic anhydride production

The catalyst prepared in Part A above was charged to a tubular converter as in Example I, Part B, above. Benzene-air mixtures were oxidized in this converter in a manner similar to that of said Example I. The results of a series of runs (about 20 hours each) are given in Table III below.

TABLE III

| Benzene | | Air, gms./hr. | Air/Benzene Ratio | Catalyst, Avg. Temperature | Maleic Acid Produced, g. | Maleic Acid, lbs./100 lbs. Benzene |
| --- | --- | --- | --- | --- | --- | --- |
| Total Grams Vaporized | Gms./hr. | | | | | |
| 170 | 9.44 | 673.4 | 71.3 | 402 | 135.1 | 79.5 |
| 190 | 9.50 | 671.4 | 70.7 | 415 | 135.1 | 71.1 |
| 213 | 10.7 | 633.1 | 59.4 | 430 | 152.0 | 71.4 |
| 203 | 10.2 | 672.8 | 66.3 | 460 | 170.1 | 83.8 |
| 300 | 15.0 | 800.0 | 53.3 | 480 | 208.0 | 69.4 |
| 188 | 9.4 | 818.8 | 87.1 | 424 | 160.8 | 85.6 |

EXAMPLE IV

A. Catalyst preparation

The catalyst was prepared in the same manner as in Example II-A except that 13.40 parts of silver nitrate were added instead of 8.25 parts of silver orthophosphate and 3.35 parts of silver nitrate. This quantity of silver nitrate (13.40 parts) contains the same amount of silver as is contained in 8.25 parts of silver orthophosphate and 3.35 parts of silver nitrate.

B. Maleic anhydride production

The catalyst prepared in Part A above was charged to a tubular converter as in Example I, Part B above. Benzene-air mixtures were oxidized in this converter in a manner similar to that of said Example I. The results of a series of runs (about 20 hours each) are given in Table IV below.

EXAMPLE V

A. Catalyst preparation

The catalyst was prepared in the same manner as in Example II-A.

B. Phthalic anhydride production

A tubular, molten salt-cooled converter of conventional design was loaded with the catalyst as prepared in Example V-A above. Naphthalene-air mixtures were passed through the converter, and product gas samples were condensed to recover oxidation products for analysis. Similarly, orthoxylene was passed through the converter under the same reaction conditions. The results obtained are given in Table V below.

TABLE V

| Starting Material, g/hr. | Air, g/hr. | Air/Hydrocarbon Ratio | Catalyst, Maximum Temp. | Phthalic Anhydride, lbs. per 100 lbs. Starting Material |
| --- | --- | --- | --- | --- |
| 215–252 [a] | 8,130–9,430 | 37.6 | 525 | 96 |
| 181–209 [b] | 8,130–9,430 | 45.0 | 525 | 88 |

[a] Naphthalene. [b] Ortho-xylene.

Silver orthophosphate is a high melting (M.P. 849° C.) stable salt which does not undergo any alteration during the oxidation process, and hence differs in this respect from silver nitrate (M.P. 212°–B.P. 444° C. with de-

TABLE IV

| Benzene | | Air, gms./hr. | Air/Benzene Ratio | Catalyst, Avg. Temperature | Maleic Acid Produced, g. | Maleic Acid, lbs./100 lbs. Benzene |
| --- | --- | --- | --- | --- | --- | --- |
| Total Grams Vaporized | Gms./hr. | | | | | |
| 202 | 10.1 | 670.7 | 66.4 | 455 | 170.1 | 84.2 |
| 203 | 10.2 | 824.4 | 81.2 | 440 | 177.3 | 87.3 |
| 299 | 16.6 | 688.0 | 41.4 | 540 | 253.3 | 84.7 |
| 338 | 16.9 | 797.5 | 47.2 | 510 | 271.4 | 80.3 |
| 495 | 24.8 | 1,113.9 | 45.0 | 580 | 375.8 | 75.9 | composition) which probably decomposes to the oxide during the reaction.

Although I do not wish to be bound by this explanation, silver nitrate, a well-known component of vanadium-molybdenum oxide catalysts, funtcions to accelerate the oxidation of benzene to maleic acid anhydride. Silver orthophosphate primarily inhibits the condensation of maleic acid anhydride to a dimeric product.

However, in the absence of silver nitrate (silver oxide), the main reaction of benzene oxidation to maleic anhydride occurs at a lesser rate, and hence the preferred addition of the promoter, silver nitrate. I also term silver phosphate a promoter since it "promotes" the yield of maleic anhydride by inhibiting the course of at least one of the side reactions.

The difference in action and the preferred conjunctive use of silver orthophosphate and silver nitrate is clearly demonstrated by the examples disclosed hereinabove, wherein it can be seen that the yield of maleic acid is significantly lowered from 96.5–111.8 lbs. to 71.1–87.3 lbs. of maleic acid per 100 lbs. of benzene when silver orthophosphate is omitted from the catalyst even if the amount of silver (as silver nitrate) is increased to that amount present in the form of silver orthophosphate and silver nitrate (Example IV). In addition, the yield is likewise improved in comparison with a standard known catalyst in which trisodium orthophosphate has been used in place of the silver modifier.

Other auxiliary promoters known in this art which can be used in addition to, or in place of, silver nitrate are the oxides of cerium, cobalt, tin and the like. When such an auxiliary promoter is used, the amount of such as the oxide can be varied from about 1 percent to about 15 percent of the weight of $V_2O_5$ present. Preferably about 2.5 percent of silver as silver oxide should be used.

While the above describes the preferred embodiments of the invention, it will be understood that departures can be made therefrom within the scope of the specification and claims.

I claim:
1. A catalyst composition suitable for the vapor phase oxidation of an organic compound to a dicarboxylic acid anhydride comprising a carrier coated with a mixture comprising essentially vanadium pentoxide and, as a modifier, silver orthophosphate in an amount equal to at least 2 percent of the weight of the vanadium pentoxide present.

2. A catalyst composition suitable for the vapor phase oxidation of an organic compound to a dicarboxylic acid anhydride comprising a carrier coated with a mixture comprising essentially vanadium pentoxide and molybdenum trioxide and, as a modifier, silver orthophosphate in an amount from about 2 to about 20 percent of the weight of the vanadium pentoxide present.

3. A catalyst composition as described in claim 2, wherein the amounts of vanadium pentoxide and molybdenum trioxide present correspond to a $V_2O_5:MoO_3$ ratio of from 15:1 to 1:2, by weight.

4. A catalyst composition as described in claim 3 wherein the vanadium pentoxide content corresponds to from about 60% to about 85% of the weight of the catalyst coating.

5. A catalyst composition as described in claim 3, wherein said composition also contains an amount of silver nitrate, calculated as silver oxide, corresponding to from about 1 to about 15 percent of the weight of the vanadium pentoxide.

6. A catalyst composition suitable for the vapor phase oxidation of an organic compound to a dicarboxylic acid anhydride comprising an aluminum oxide carrier coated with a catalyst coating comprising essentially a mixture of vanadium pentoxide, molybdenum trioxide and silver orthophosphate in amounts corresponding to a weight ratio of vanadium pentoxide to the catalyst coating of from about 60 to about 85 percent, a $V_2O_5:MoO_3$ ratio of from 15:1 to 1:2, by weight, and a weight ratio of silver orthophosphate to vanadium pentoxide of at least 2 percent.

7. A catalyst composition suitable for the vapor phase oxidation of an organic compound to a dicarboxylic acid anhydride comprising a porous fused aluminum oxide carrier coated with a catalyst coating comprising essentially a mixture of vanadium pentoxide, molybdenum trioxide, uranium oxide and silver orthophosphate in amounts corresponding to a weight ratio of vanadium pentoxide to the catalyst coating of from about 60 to about 85 percent, a $V_2O_5:MoO_3$ ratio of from 15:1 to 1:2, by weight, a weight ratio of uranium dioxide to the catalyst coating of about 1 percent and a weight ratio of silver orthophosphate to vanadium pentoxide of at least 2 percent.

8. A catalyst composition as described in claim 7 wherein the coating contains an amount of silver nitrate, calculated as silver oxide, corresponding to a weight ratio of silver oxide to vanadium pentoxide of from about 1 to about 15 percent.

References Cited by the Examiner

UNITED STATES PATENTS

| | | | |
|---|---|---|---|
| 2,294,130 | 8/1942 | Porter | 252—467 X |
| 2,496,621 | 2/1950 | Deery | 252—437 X |
| 2,569,092 | 9/1951 | Deering | 252—437 X |
| 2,622,098 | 12/1952 | Elce et al. | 260—546 |
| 2,658,914 | 11/1953 | Rigon | 260—546 |
| 2,773,921 | 12/1956 | Rylander et al. | 252—435 X |
| 2,816,081 | 12/1957 | Heath et al. | 252—437 |
| 2,850,463 | 9/1958 | Romanousky et al. | 252—437 |
| 2,885,409 | 5/1959 | Ryder | 252—467 X |

OSCAR R. VERTIZ, *Primary Examiner.*

JULIUS GREENWALD, MAURICE A. BRINDISI, W. S. BROWN, H. T. CARTER, *Assistant Examiners.*